United States Patent [19]

Kojima et al.

[11] Patent Number: 5,145,721
[45] Date of Patent: Sep. 8, 1992

[54] METHOD OF COATING AN ARTICLE WITH A POLYTETRAFLUOROETHYLENE COATING MATERIAL

[75] Inventors: Takeshi Kojima, Kyoto; Taketoshi Nakajima, Kawagoe, both of Japan

[73] Assignee: Haruhiko Murakami, Okegawa, Japan

[21] Appl. No.: 548,881

[22] PCT Filed: Nov. 22, 1989

[86] PCT No.: PCT/JP89/01188

§ 371 Date: Sep. 21, 1990

§ 102(e) Date: Sep. 21, 1990

[87] PCT Pub. No.: WO90/05593

PCT Pub. Date: May 31, 1990

[30] Foreign Application Priority Data

Nov. 22, 1988 [JP] Japan .................... 63-295436

[51] Int. Cl.$^5$ ............................ B05D 3/02
[52] U.S. Cl. ..................... 427/379; 427/381; 427/407.1; 427/408; 427/412.1; 525/129; 525/131
[58] Field of Search ............ 427/385.5, 379, 381, 427/407.1, 408, 412.1; 525/129, 131

[56] References Cited

U.S. PATENT DOCUMENTS

| | | | |
|---|---|---|---|
| 4,483,900 | 11/1984 | Goldfarb | 427/392 X |
| 4,863,986 | 9/1989 | Re et al. | 525/129 X |
| 4,923,929 | 5/1990 | Ohwada et al. | 525/129 X |

FOREIGN PATENT DOCUMENTS

| | | |
|---|---|---|
| 50-25633 | 3/1975 | Japan . |
| 54-65638 | 5/1979 | Japan . |
| 59-66463 | 4/1984 | Japan . |
| 61-97367 | 5/1986 | Japan . |

*Primary Examiner*—Michael Lusignan
*Attorney, Agent, or Firm*—Spencer, Frank & Schneider

[57] ABSTRACT

A fluorine resin having relatively high melting point such as polytetrafluoroethylene and tetrafluoroethylene-perfluoroalkylvinylether copolymer resins is added to a polyester having the double bond of a polyisocyanate or dibasic acid with a polyhydric alcohol followed by stirring, and a coat of the resulting stirred mixture is applied to a plastic product or the like, whereby the fluorine resin is firmly held on the coated surface, and a film of the fluorine resin is formed on the coated surface.

12 Claims, No Drawings

METHOD OF COATING AN ARTICLE WITH A POLYTETRAFLUOROETHYLENE COATING MATERIAL

TECHNICAL FIELD

This invention relates to a method of coating articles with a base coat and a top coating, the top coat including polytetrafluoroethylene (hereinafter referred to as PTFE) fluorine resins. The articles may, for example, be plastics and wooden products such as unit baths, bathtubs, bath articles, tableware, yachts, and pools.

BACKGROUND ART

Fluorine resins include Polyvinylfluoride resins (PVF), Polyvinylidenefluoride (PVdF), Polychlorotrifluoroethylene (PCTFE), Polytetrafluoroethylene resins (PTFE), Fluorinated ethylene-propylene copolymer resins (FEP), and Tetrafluoroethylene-perfluoroalkylvinylether copolymer resins (PFA), and it has been known that they have excellent properties. For example, they are non-tacky, have a low coefficient of friction and a good chemical resistance, and are electrical insulators. Particularly, PTFE and PFA have excellent properties.

To utilize the excellent properties of fluorine resins, attempts are being made to coat various products with the fluorine resins.

However, as the fluorine resins (particularly PTFE and PFA) have extremely high melting points (about 300° C.) a coat of the fluorine resins could not be applied direct to plastics having melting points lower than those of these resins.

In products such as unit baths, particularly, FRP resins are used as raw materials, but as their melting points are as low as 120°–140° C., a direct PTFE resin finishing of the raw material surface can not be conducted.

In recent years, therefore, a number of fluorine resin-mixed type coating materials have been invented, and methods have been adapted to apply a coat of these materials to a material surface to be coated.

Such conventional fluorine resin coating materials have an inconvenience in that they show the characteristics of fluorine resins early in the application to a product, but they peel away when used for a long time because of their lack of adhesion to the coated material surface.

Therefore, it is an object of this invention to provide a method of coating with PTFE resins, which makes it easy to apply the resins to plastic products and gives excellent adhesion of coating materials to the products.

DISCLOSURE OF THE INVENTION

Namely, this invention achieves the present object by a method of applying a polytetrafluoroethylene coating material to a material to be coated comprising:

(a) a step of adding 2–10 wt % of a polytetrafluoroethylene or polytetrafluoroethylene-perfluoroalkylvinylether copolymer resin to a polyester polyol or acrylic polyol followed by stirring, (b) a step of mixing a polyisocyanate with the solution prepared in the step (a) in a ratio of 1:1–4:1 just before coating and sufficiently stirring the mixture followed by coating, and (c) a step of conducting initial drying at 60° C. or less after the coating and then natural drying at room temperature.

The second invention further achieves the present object by a coating method of a polytetrafluoroethylene coating material to a material to be coated, which comprises:

(a) a step of adding 2–10 wt% of a polytetrafluoroethylene or polytetrafluoroethylene-perfluoroalkylvinyl ether copolymer resin to an unsaturated polyester resin followed by stirring, (b) a step of mixing an oxidizing agent with the solution prepared in the step (a) just before coating and sufficiently stirring the mixture followed by coating, and (c) a step of conducting initial drying at 60° C. or less after the coating and then natural drying at room temperature.

As the polyisocyanates to be mixed with the solution, aromatic polyisocyanates in the case of polyester polyol and aliphatic polyisocyanates in the case of acrylic polyol are used.

The polyester polyol used in this invention can be obtained by the condensation reaction of a polybasic acid with a polyhydric alcohol.

The polybasic acid is a compound containing two or more carboxyl groups in one molecule, and the polyhydric alcohol is a compound containing two or more hydroxyl groups in one molecule.

As the acrylic polyols, various acrylic polyols derived from starting monomers containing, as essential components, monomers having $\alpha$, $\beta$-ethylenic unsaturated groups and hydroxyl groups, for example, monomers such as 2-hydroxyethyl(meta)acrylate, are used.

As prepolymers of the aromatic polyisocyanates, Tolylenediisocyanate (TDI), 4,4'-diphenylmethanediisocyanate (MDI), Xylylenediisocyanate (XDI), 4,4'-methylenebis(cyclohexyl)isocyanate, Methylcyclohexane 2,4(2,6) diisocyanate, 1,3-(isocyanatemethyl)-cyclohexane, and isophoronediisocyanate (IPDI) are used.

As prepolymers of the aliphatic polyisocyanates, Hexamethylenediisocyanate (HDI), Lysinediisocyanate (LDI), Trimethylhexamethylenediisocyanate (TMDI), and Dimer acid diisocyanate (DDI) are used.

As the polybasic acids, organic acids such as maleic acid and fumaric acid are used.

As the polyhydric alcohols, glycols such as propylene glycol and ethylene glycol are used.

As the oxidizing agents to be added to the unsaturated polyester, for example methylethylketone peroxide and cyclohexanone peroxide are used.

In the step (a) of the coating method according to this invention, first, the mixed PTFE and PRA are made in the state satisfactorily dispersed in the polyester polyol, unsaturated polyester or acrylic polyol.

The mixing of the polyisocyanate or oxidizing agent with the coating material prior to coating results in providing viscosity to the coating material, which is thus applied to the coated material to be connected in this state.

When the coated surface is dried at 60° C. or less after the coating, the fluorine resins such as PTFE and PFA dispersed in the coating resin gradually float on the surface, and the coating material is dried in the floating state to form a firmly bonded state of the coating resin and the fluorine resin.

Further, the whole resin is completely hardened by natural drying, whereby the coating process is completed.

Thus, a film of the fluorine resin is closely adhered on the coated surface.

BEST MODE FOR CARRYING OUT THE INVENTION

The present invention is illustrated in more detail according to the following embodiments.

EXAMPLE 1

A PTFE resin coating consisting of a base coating and top coating as shown below was carried out.

(a) Base Coating

A two-liquid hardening type polyurethane resin coating material, in which a polyester polyol (Solution A) consisting of trimethylolpropane, succinic anhydride, adipic acid and cyclohexane dimethanol is mixed with a tolylenediisocyanate of aromatic polyisocyanate (Solution B) in the ratio of Solution A:Solution B=4:1, is diluted with thinner to make a viscosity of 23 sec. as measured by a Ford cup (room temperature 20° C.).

The diluted coating material is evenly stirred and poured into a coater while filtering with a 150-mesh filter net, and then coating is carried out.

After the coating, the coating surface is naturally dried for about 15 minutes until the solvent on the coating face is evaporated, dried at 50° C. for 30 minutes by means of an exclusive dryer, and then cooled to 20° C. or less.

The base coat formed film, thus hardened and dried, is excellent in the following respects:

Excellent build

High paint film hardness, and high bending property and adhesion of the dried paint film High luster of the dried paint film Excellent chemical resistance of the dried paint film Excellent usability for lacquered ware and tableware on account of its lead-free type.

(b) Top Coating

A uniformly dispersed main agent is prepared by adding 5 wt % of polytetrafluoroethylene to 95 wt % of the above-said polyester polyol and rotating the mixture at 50 rpm for 24 hours in a stirring pot.

To the uniformly dispersed main agent, tolylenediiosycanate of aromatic polyisocyanate is mixed in a ratio of 1:1 just before coating.

The resulting mixed coating material is diluted with thinner to make the viscosity 23 sec. as measured by a Ford cup (room temperature 20° C.) and poured into a coater, and coating is carried out within two hours.

Natural drying is conducted for about 60 minutes until the solvent on the coating face of the top coat is evaporated.

Then, initial drying of the top coat at 60° C. for 60 minutes means of a dryer is conducted, but as the top coat may still not completely harden, the coating face is then further naturally dried for 24 hours as it stands for complete hardening.

The coating face thus completely hardened has a thickness of 70µ–100µ, and the surface is covered with the polytetrafluoroethylene resin.

EXAMPLE 2

The following top coating process is for application to a surface to be coated having the base coating of Example 1.

(b) Top Coating

A uniformly dispersed main agent is prepared by (1) adding 5 wt % of polytetrafluoroethylene to 95 wt % of an unsaturated polyester resin in which an acid component consisting of maleic anhydride and a polyester containing an unsaturated bond in the main chain are dissolved in the polymeric monomer of styrene, and (2) rotating the mixture at 50 rpm for 24 hours in a stirring pot.

To the uniformly dispersed main agent, 1.2 wt % of methylethylketone peroxide as an oxidizing agent is added just before coating, and further an organic acid cobalt salt is sufficiently stirred therewith as a catalyst.

The resulting mixed coating material is diluted by thinner to make the viscosity 30 sec. as measured by a Ford cup (room temperature 20° C.) and poured into a coater, and coating is carried out within two hours of dilution.

Natural drying is conducted for about 60 minutes until the solvent on the coating face of the top coat is evaporated.

Then, initial drying of the top coat at 50° C. by means of a dryer is conducted for 60 minutes, but as the top coat may still not completely harden, the coating surface is then further naturally dried for 24 hours as it stands for its complete hardening.

The coating face thus completely hardened has a film thickness of 70µ–100µ, and the surface is coveed with the polytetrafluoroethylene resin.

EXAMPLE 3

The following top coating is conducted to a coated surface to be coated having the base coating of Example 1.

(b) Top Coating

A uniformly dispersed main agent is prepared by adding 5 wt % of polytetrafluoroethylene to 95 wt % of an acrylic polyol formed by the following method and rotating the mixture at 50 rpm for 24 hours in a stirring pot.

To the uniformly dispersed main agent, hexamethylenediisocyanate of aliphatic polyisocyanate is added in the ratio of 4:1 just before coating.

The resulting mixed coating material is diluted by thinner to make the viscosity 23 sec. as measured by a Ford cup (room temperature 20° C.) and poured into a coater, and then the coating is carried out.

Natural drying is conducted for about 60 minutes until the solvent on the coating face of the top coat is evaporated.

Further, initial drying of the top coat at 50° C. by means of a dryer is conducted for 60 minutes, but as the top coat may still not completely harden, the coating surface then is further naturally dried for 24 hours as it stands for its complete hardening.

The coating surface thus completely hardened has a film thickness of 70µ–100µ, and the surface is covered with the polytetrafluoroethylene resin.

COMPOSITION AND METHOD OF PREPARATION OF ACRYLIC POLYOL

Composition n-butyl methacrylate: 25 wt %
n-butyl acrylate: 35 wt %
2-hydroxy acrylate: 40 wt %

Preparation Method

The acrylic polyol having the above composition is copolymerized by using mercaptan as a chain transfer agent and azobisisobutyronitrile as a polymerization initiator and then purified by reduced pressure treatment and fractional treatment.

TEST 1

For the surface to be coated having the base coating of Example 1-(1), their performances when 5 wt % of PTFE in Example 2 (This Invention 2), 1 wt % (Comparative Example 1), 10 wt % (This Invention 4), and 15 wt % (Comparative Example 2) were mixed; compared and examined.

TABLE 1

| | | Comparison method and result | |
|---|---|---|---|
| Designation | Mixed amount of PTFE Unit (wt %) | State of coated film (after drying) | Wet resistance 49° C., 98% RH, 900 hrs |
| Comparative Example 1 | 1 wt % | Normal | Coated surface is whitened |
| This Invention 2 | 5 wt % | Normal | Normal |
| This Invention 4 | 10 wt % | Normal | Normal |
| Comparative Example 2 | 15 wt % | Cracking | Normal |

From the above results, it was found that the water resistance is poor when the mixed amount of PTFE is 1 wt % or less, and the coated surface are unpreferably cratered to cause cracking at 15 wt % or more.

TEST 2

The properties of the coated surfaces having the top coatings of Examples 1, 2, and 3 were examined for the items shown in Table 2

TABLE 2

| | Coated surface | | | |
|---|---|---|---|---|
| Test Item | Example 1 | Example 2 | Example 3 | Note |
| Hardness | 85 or more | 85 or more | 85 or more | Sward Hardness Rocker |
| Adhesion | 100/100 | 100/100 | 100/100 | Cross-cut adhesion test (1 mm) |
| Bending property | Normal | Normal | Normal | 2 mmø |
| Shock resistance | Acceptable | Acceptable | Acceptable | After 72 hrs, 300 g, 100 cm |
| Abrasion resistance | 140 mgr | 140 mgr | 140 mgr | Taber's tester CS17 1 kgw, 1000 rpm |
| Wet resistance | Normal | Normal | Normal | Placed at 49° C., 98% RH for 500 hrs |
| Boiling test | Normal | Normal | Normal | Boiled at 100° C. for 60 mins |

ILLUSTRATION OF TEST METHOD (1) Hardness Test: Sward Hardness Rocker

An indenter is rolled and vibrated on a horizontal coated surface, and the number of vibration frequency required to reduce the amplitude by half is measured. The higher the rotation number, the harder the coated surface.

(2) Cross-Cut Adhesion Test

Eleven parallel lines are vertically and laterally drawn on a sample piece covered with a paint film at intervals of 1 mm by determined needles, respectively, to form 100 squares surrounded by four lines. A determined cellophane adhesive tape is stuck to the sample piece without forming bubbles, then one end of the tape is rapidly peeled by the hand, and the adhesion state of the paint film on the tape is examined.

(3) Bending Test

A 2 mm-diameter hole is bored in a coated surface, the sample piece is bent with said hole outside, and the resistance against cracking by unequal elongations of the upper and lower surfaces of the paint film generated at that time is examined.

(4) Impact Test

A shock of created by dropping an object of 100 g from a height of 1 m is given to the surface of the paint film, and the elasticity and adhesive strength of the paint film after 72 hours are examined.

From the above tests, it was found that all of the invented products of Examples 1, 2, and 3 have excellent properties.

TEST 3

The coated surfaces having the top coating of Examples 1, 2, and 3 were examined as to their properties of chemical resistance.

The results were as shown in Table 3.

TABLE 3

| Chemicals | Conc. centration % | Temp °C. | This Invention 1 | This Invention 2 | This Invention 3 |
|---|---|---|---|---|---|
| Conc. sulfuric acid | 50 | 20 | normal for 1 month | normal for 1 month | normal for 1 month |
| Sulfuric acid | 20 | 50 | normal for 1 month | normal for 1 month | normal for 1 month |
| Hydrochloric acid | 20 | 20 | normal for 3 months | normal for 3 months | normal for 3 months |
| Nitric acid | 5 | 50 | normal for 1 month | normal for 1 month | normal for 1 month |
| Nitric acid | 20 | 20 | normal for 10 days | normal for 10 days | normal for 10 days |
| Acetic acid | 10 | 20 | normal for 7 days | normal for 7 days | normal for 7 days |
| Chromic acid | 50 | 20 | normal for 10 days | normal for 10 days | normal for 10 days |
| Ammonia | 20 | 20 | normal for 10 days | normal for 10 days | normal for 10 days |
| Water | — | 20 | normal for 1 year | normal for 1 year | normal for 1 year |
| Carbon | — | 20 | normal | normal | normal |

TABLE 3-continued

| Chemicals | Conc. centration % | Temp °C. | This Invention 1 | This Invention 2 | This Invention 3 |
|---|---|---|---|---|---|
| disulfide | | | for 6 months | for 6 months | for 6 months |
| Brine | 5 | 20 | normal for 1 year | normal for 1 year | normal for 1 year |
| Alcohol | 95 | 20 | normal for 1 year | normal for 1 year | normal for 1 year |
| Gasoline | — | 20 | normal for 1 year | normal for 1 year | normal for 1 year |
| Castor oil | — | 20 | normal for 1 year | normal for 1 year | normal for 1 year |
| Insulating oil | — | 20 | normal for 1 year | normal for 1 year | normal for 1 year |
| Glycerol | — | 20 | normal for 1 year | normal for 1 year | normal for 1 year |
| Formalin | 37 | 20 | normal for 10 days | normal for 10 days | normal for 10 days |
| Oxalic acid | Unsaturated soln | 20 | normal for 1 year | normal for 1 year | normal for 1 year |

From the above results, it was found that all the cases of Examples 1, 2, and 3 have the properties possessed by PTFE.

TEST 4

The surfaces of the top coatings formed according to Examples 1, 2 and 3 and Comparative Example 1 were compared as to the state of dirt thereon after dipping the coated surfaces in a shampoo, a bath agent and a soap solution at 23° C. for 24 hours followed by washing with water.

TABLE 4

| | Test result | | | |
|---|---|---|---|---|
| Kind of dip solution | This Invention 1 | This Invention 2 | This Invention 3 | Comparative Example 1 |
| Shampoo | Normal | Normal | Normal | Discolored |
| Bath liquid | Normal | Normal | Normal | Discolored |
| Soap solution | Normal | Normal | Normal | Normal |

From the above results, it was found that the coated surfaces of Examples 1, 2, and 3 (5 wt % of PTFE is mixed) can be cleaned easily when soiled.

TEST 5

The surfaces of the top coatings formed according to Examples 1, 2, and 3 and Comparative Example 1 were put to heat resistance tests identified in Table 5, and the resulting states were compared.

TABLE 5

| Examined items | This invention 1 | This invention 2 | This invention 3 | Comparative Example 1 |
|---|---|---|---|---|
| Heat resistance (dipped in 90° C. water for 30 days) | Normal | Normal | Normal | Whitened |
| 20 cycles of 2 hr alternation of −20° C., 80° C. | Normal | Normal | Normal | Whitened |

From the above results, it was found that coatings of Examples 1, 2, and 3 (5 wt % PTFE is mixed) are resistant to temperature change as well as to heat.

EXAMPLE 4

The following top coating is conducted on a coated surface having the base coating of Example 1.

A uniformly dispersed main agent is prepared by adding 8 wt % of polytetrafluoroethylene to 92 wt % of the polyester polyol used in the base coating and rotating the mixture at 50 rpm for 24 hours in a stirring pot.

To uniformly dispersed agent, tolylenediisocyanate of aromatic polyisocyanate is mixed in the ratio of 1:1 just before coating.

The resulting mixed coating material is diluted with thinner to make the viscosity 23 sec. Ford cup (room temperature 20° C.) and poured into a coater, and coating is carried out within two hours of dilution.

Then, natural drying is conducted for about 60 minutes until the solvent on the coating surface of the top coat is evaporated.

Further, initial drying of the top coat is conducted at 50° C. by a dryer for 60 minutes, but as the top coat may not completely harden. coating surface is then further naturally dried for 24 hours as it stands for its complete hardening.

The coating surface thus completely hardened had the properties almost equal to those of Examples 1, 2, and 3.

TEST 6

Top coatings with various initial drying temperatures as shown in Table 7 were conducted on a coated surface having the base coating of Example 1.

(b) Top Coating

A uniformly dispersed main agent is prepared by adding 8 wt % of polytetrafluoroethylene to 92 wt % of the polyester polyol used to the base coating, and rotating the mixture at 50 rpm for 24 hours in a stirring pot.

To the uniformly dispersed main agent, tolylenediisocyanate of aromatic polyisocyanate is mixed in the ratio of 1:1 just before coating.

Natural drying is conducted for about 60 minutes until the solvent on the coating surface of the top coat is evaporated.

Further, the coating surface is initially dried at temperatures shown in Table 7 for 60 minutes by means of a dryer, and then naturally dried for 24 hours as it stands until it is completely hardened.

The coating surfaces thus completely hardened were examined with respect to water resistance. The results were as shown in Table 7.

In the test of water resistance, the states of the coated surfaces after the surfaces were dipped in a high temperature water of 90° C. for 30 days were compared and examined.

TABLE 7

| Compared Designation | Drying Temperature | Test Result |
|---|---|---|
| This Invention 1 | 60° C. | Normal |
| This Invention 2 | 40° C. | Normal |
| Comparative Example 3 | 80° C. | Craters are formed on the surface |

From the above results, it was found that too high a drying temperature is not preferred because a smooth coated surface is not provided.

EXPLOITATION IN INDUSTRY

The coating method according to this invention provides a coated surface which will not peel away for a long period and which have excellent heat, water and chemical resistances, compared with the case of conventional PTFE resin-mixed coating materials, and thus when it is used for bath units etc., re-coating is not required.

What is claimed is:

1. A method of coating an article, comprising the steps of:
    (a) diluting a two-liquid hardening type polyurethane resin coating material which includes a polyol (solution A) and a polyisocyanate (solution B) mixed together in the ratio of Solution A:Solution B=4:1, with thinner until the viscosity is 23 seconds as measured by a Ford cup (room temperature 20° C.),
    (b) stirring the diluted coating material uniformly and pouring it into a coater while filtering with a 150-mesh filter net, followed by coating an article with the filtered material to form a base coat on the article,
    (c) naturally drying of the base coat until the solvent on the surface of the base coat is evaporated, then drying at 50° C. by means of a dryer, and then cooling the surface of the base coat to 20° C. or less,
    (d) adding 2-10 wt % of a polytetrafluoroethylene or polytetrafluoroethylene-perfluoroalkylvinylether copolymer resin to a polyester polyol or acrylic polyol, followed by stirring to obtain a solution C,
    (e) mixing a polyisocyanate with the solution C in a ratio of 1:1–4:1, stirring the mixture, and then coating the stirred mixture onto the cooled surface of the base coat to form a top coat on the base coat, and
    (f) initially drying the top coat at 60° C. or less and then naturally drying the top coat.

2. A method according to claim 1 wherein the stirring in said step (d) is performed at 50 rpm for 24 hours.

3. A method according to claim 1 wherein the top coat has a thickness of 70–100μ.

4. A method according to claim 1 wherein the polyol of the solution C is polyester polyol, and the polyisocyanate mixed with the solution C is an aromatic polyisocyanate.

5. A method according to claim 1 wherein the polyol of the solution C is acrylic polyol, and the polyisocyanate mixed with the solution C is an aliphatic polyisocyanate.

6. A method of coating an article, comprising the steps of:
    (a) diluting a two-liquid hardening type polyurethane resin coating material, including a polyol (solution A) and a polyisocyanate (solution B) mixed in the ratio of solution A:solution B=4:1, with thinner until the viscosity is made 23 seconds as measured by a Ford cup (room temperature),
    (b) stirring the diluted coating material uniformly and pouring it into a coater while filtering with a 150-mesh filter net, followed by coating the article with the filtered material to form a base coat on the article,
    (c) naturally drying of the base coat until the solvent on the coating surface is evaporated, then drying at 50° C. with a dryer, and then cooling the surface of the base coat to 20° C. or less,
    (d) adding 2-10 wt % of a polytetrafluoroethylene or polytetrafluoroethylene-perfluoroalkylvinylether copolymer resin to an unsaturated polyester resin to obtain a solution C, followed by stirring,
    (e) mixing an oxidizing agent with the solution C, stirring the mixture and then coating the stirred mixture onto the cooled surface of the base coat to form a top coat on the base coat, and
    (f) initially drying the top coat at 60° C. or less and then naturally drying the top coat.

7. A method according to claim 6 wherein the stirring in step (d) includes stirring at 50 rpm for 24 hours.

8. A method according to claim 6 wherein the top coat has a film thickness of 70–100 μ.

9. A method according to claim 6 wherein the polyol of the solution C is a polyester polyol, and the polyisocyanate mixed with the solution C is an aromatic polyisocyanate.

10. A method according to claim 6 wherein the polyol of the solution C is an acrylic polyol, and the polyisocyanate mixed with the solution C is an aliphatic polyisocyanate.

11. A method according to claim 6, wherein the initial drying in said step (f) is at about 50° C.

12. A method according to claim 1, wherein the initial drying in step (f) is at about 50°–60° C.

* * * * *